(12) United States Patent
Liao (10) Patent No.: US 6,415,898 B1
(45) Date of Patent: Jul. 9, 2002

(54) WINDING BOX WITH AN AUXILIARY RECEPTACLE

(76) Inventor: Sheng-Hsin Liao, No. 10, Alley 38, Lane 229, San Chun St., Shulin, Taipei Hsien (TW)

( * ) Notice: Subject to any disclaimer, the term of this patent is extended or adjusted under 35 U.S.C. 154(b) by 0 days.

(21) Appl. No.: 09/875,899

(22) Filed: Jun. 8, 2001

(51) Int. Cl.[7] ............................................. H02G 11/00
(52) U.S. Cl. ................................................... 191/12.4
(58) Field of Search ......................... 191/12 R, 12.2 R, 191/12.4, 12.2 A; 439/4, 501; 379/437, 438, 440

(56) References Cited

U.S. PATENT DOCUMENTS

| | | | | |
|---|---|---|---|---|
| 5,339,461 A | * | 8/1994 | Luplow | 242/385 |
| 5,422,957 A | * | 6/1995 | Cummins | 381/384 |
| 6,176,358 B1 | * | 1/2001 | Hsin | 191/12.2 R |
| 6,179,238 B1 | * | 1/2001 | Phillipps | 191/12.4 |
| 6,253,893 B1 | * | 7/2001 | Chi-Min | 174/113 R |
| 6,254,025 B1 | * | 7/2001 | Liao | 242/378.1 |
| 6,337,444 B1 | * | 1/2002 | Liao | 174/135 |
| 6,364,079 B1 | * | 4/2002 | Hiura | 191/12.4 |

* cited by examiner

*Primary Examiner*—Mark T. Le
(74) *Attorney, Agent, or Firm*—Rosenberg, Klein & Lee (57) ABSTRACT

A winding box with an auxiliary receptacle includes a housing, a rotary disk, a spiral spring, communication wires and an auxiliary receptacle. The auxiliary receptacle is installed within the housing. The housing is installed with a through hole with respect to the auxiliary receptacle. Other than being connected to the two communication devices, the communication wires can be connected to the plug of a third communication device through the auxiliary receptacle so that three communication devices can be connected.

7 Claims, 7 Drawing Sheets

WINDING BOX WITH AN AUXILIARY RECEPTACLE

FIELD OF THE INVENTION

The present invention relates to a winding box with an auxiliary receptacle, and especially to a winding box which can be used to connect three communication devices so that the applications of the winding box is expanded.

BACKGROUND OF THE INVENTION

The communication wires are widely used in computers, modems, telephones or fax machines for being connected to other communication devices. To avoid too long or too many communication wires are improperly wound together or the communication wires are too short to meet the practical requirement. Various winding boxes are developed by the inventors of the present invention, such as Taiwan Patent Nos. 86209323, 86209324, 88203935, 88206805, 88206807, 88207863, 88209138, 88211508, 88213013, 88215976, etc. Most of the winding boxes have a housing, a rotary disk, a spiral spring, and communication wires. The spiral spring and rotary disk are connected so that the communication wires on the rotary disk have an elastic restoring force for winding and restoring.

Furthermore, conventionally, as a communication wire is pulled out from the winding box, it is possible that the communication wire is tighten due to the strong elastic force of the spiral spring. Therefore, it is difficult to retain a proper length out of the box. This is a big trouble to the user. Therefore, the inventor creates many different winding boxes, such as those disclosed in Taiwan Patent Nos. 88206807, 88207863, 88209138, 88209416, etc. In these designs, a swinging piece and the notches at the periphery of the rotary disk are matched to the buckling groove for generating winding and positioning functions.

However, the prior art communication wires have two ends to be connected to two communication devices, but can not be connected to a third communication device. Therefore, the utilization is confined and can not be widely used.

SUMMARY OF THE INVENTION

Accordingly, the primary object of the present invention is to provide a winding box. Other than being connected to the two communication devices, the communication wires can be connected to the plug of a third communication device through the auxiliary receptacle so that three communication devices can be connected.

To achieve the objects, the present invention provides a winding box with an auxiliary receptacle including a housing, a rotary disk, a spiral spring, communication wires and an auxiliary receptacle. The housing has a receiving groove therein, and the housing is installed with a through hole. The rotary disk is pivotally installed to the receiving groove. The spiral spring is installed between the housing and the rotary disk. The two communication wires are wound around the rotary disk; wherein outer wire ends of the two communication wires are capable of passing out of the housing; and the auxiliary receptacle is installed within the housing. The auxiliary receptacle is connected to inner wire ends of the two communication wires, and is the positioned with respective to the through hole.

The various objects and advantages of the present invention will be more readily understood from the following detailed description when read in conjunction with the appended drawing.

DETAILED DESCRIPTION OF THE PREFERRED EMBODIMENTS

To more understand the present invention by those skilled in the art, in the following, the details will be described with the appended drawings. However, all these descriptions are used to make one fully understand the present invention, while not to used to confine the scope of the present invention defined in the appended claims.

Referring to FIGS. 1 to 4, a preferred embodiment of the winding box with an auxiliary receptacle of the present invention is illustrated. The winding box with an auxiliary receptacle includes a housing 1, a rotary disk 2, a first communication wire 3, a second communication wire 4, and an auxiliary receptacle 5.

The housing 1 is formed by a first housing half 10 and a second housing half 11. The interior thereof is formed with a receiving groove 12. The receiving groove 12 is installed with a round pivotal shaft 13. Two opposite sides of the housing 1 are installed with a first wire outlet 14 and a second wire outlet 15. The housing 1 is installed with a round through hole 16 and a key hole 17.

The rotary disk 2 is pivotally installed to the receiving groove 12. The rotary disk 2 has a pivotal hole 20 so as to be pivotally engaged to the round pivotal shaft 13 to rotate. Two sides of the rotary disk are installed with a first ring 21 and a second ring 22. The first ring 21 is installed with a hook groove 23. The housing 1 has a retaining post 18. The retaining post 18 is pivotal engaged with a reed seat 61. The reed seat 61 is enclosed by a spiral spring 6. The hook groove 23 of the first ring 21 can be buckled with the hook end 60 of the spiral spring 6 at the outer side of the rotary disk 2 so as to provide a rotation and restoring force for the rotary disk 2.

The second ring 22 is assembled to one side of the rotary disk 2. The second ring 22 is a hollow post and is installed with an inserting hole 24 and a round flange 25. A plurality of buckling holes 26 are formed at an edge of the second ring 22, and a plurality of buckling blocks 27 at positions with respect to the holes are installed on the rotary disk 2. The buckling holes 26 are capable of buckling to the buckling blocks 27 so that the second ring 22 is buckled and assembled to one side of the rotary disk 2. The flange of second ring 22 can be engaged to the through hole 16 to rotate therein. One lateral wall of the second ring 22 is installed with two opposite wire grooves 28 for being penetrated by the first communication wire 3 and second communication wire 4.

The first communication wire 3 and second communication wire 4 are wound around the second ring 22. The inner wire ends of the first communication wire 3 and second communication wire 4 pass through the second ring 22 from the wire grooves 28. Outer wire ends of the first communication wire 3 and second communication wire 4 pass out of the housing 1 through the water outlets 14 and 15. The portions of the first communication wire 3 and second communication wire 4 passing out of the housing 1 can be assembled to various communication devices, such as plugs, earphones, microphones or other devices. The first communication wire 3 and the second communication wire 4 of this embodiment are connected to a first plug 30 and a second plug 40.

The auxiliary receptacle 5 is a receptacle like that used in general communication wires and is installed on a circuit board 50. The circuit board 50 is installed with a plurality of first conductive terminal 51 and a plurality of second conductive terminal 52. The auxiliary receptacle 5 and the circuit board 50 are firmly secured to the interior of the second ring 22. The auxiliary receptacle 5 is configured with respect to the inserting hole 24 and the through hole 16. The first conductive terminal 51 and second conductive terminal 52 are electrically connected to the auxiliary receptacle 5. The first conductive terminal 51 and second conductive terminal 52 are connected to the inner wires of the first communication wire 3 and the second communication wire 4. The auxiliary receptacle 5 is connected between the first communication wire 3 and second communication wire 4. By above structure, the winding box with an auxiliary receptacle of the present invention is formed.

Figure 1:
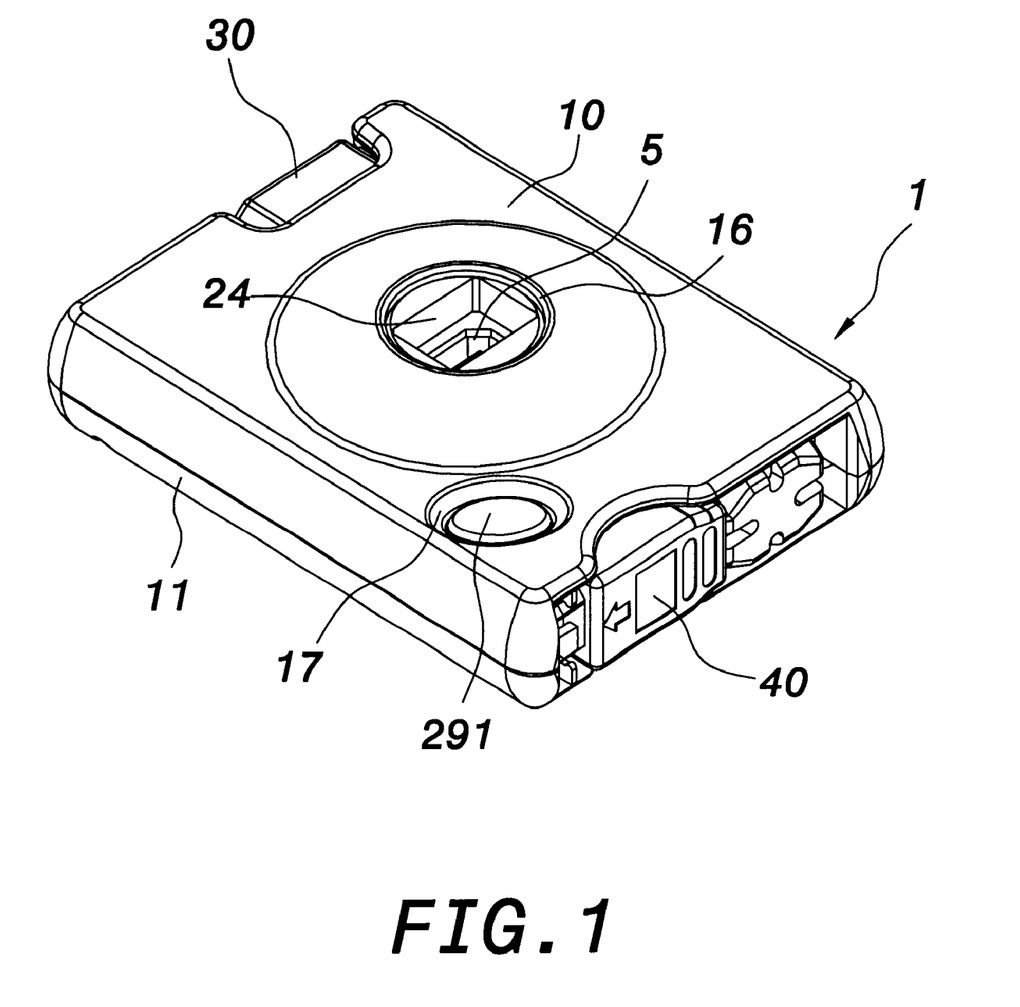
FIG. 1 is an assembled perspective view of the present invention.
Figure 2:
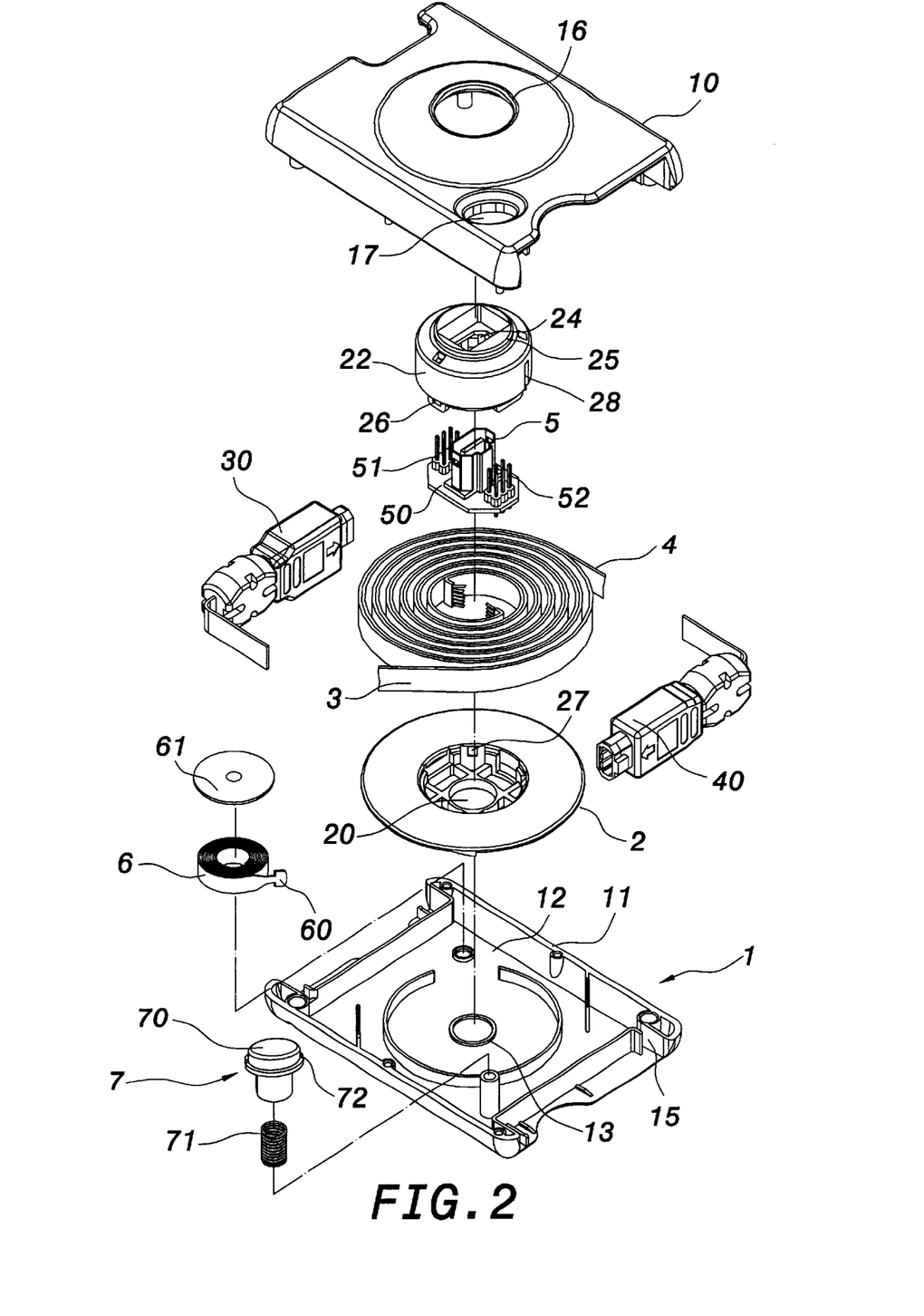
FIG. 2 is an exploded perspective view of the present invention.

Therefore, a winding box illustrated in FIG. 1 is formed. In practical application, the winding box is used to wind the first communication wire 3 and second communication wire 4 with a proper length. The first plug 30 and second plug 40 of the first communication wire 3 and second communication wire 4, respectively, can be inserted to plugs of relative communication devices for loading information. The first communication wire 3 and second communication wire 4 can be pulled out directly from the winding box. The first communication wire 3 and second communication wire 4 are acted by the spiral spring 6 in the box so as to retain a proper restoring tension force, thereby, rewinding the first communication wire 3 and second communication wire 4 successfully. No wire is exposed so as to improperly wind.

Besides, to avoid that as the user draws the first communication wire 3 and second communication wire 4, the user is affected by the winding tension, a periphery of the rotary disk 2 is installed with a plurality of stopper 29 with a unidirectionally buckling function. A control device 7 is installed adjacent to the rotary disk 2, which is formed by a key 70 and a spring 71. The key 70 is matched to the key hole 17. The spring 71 is installed between the key 70 and the housing 1. The key 70 is installed with a buckling block 72. The spring 71 pushed the key 70 to be slighlty protruded from the key hole 17. The buckling block 72 of the key 70 can rotate on the rotary disk 2 so as to buckle the stopper 29 to stop the rotary disk 2.

Figure 3:
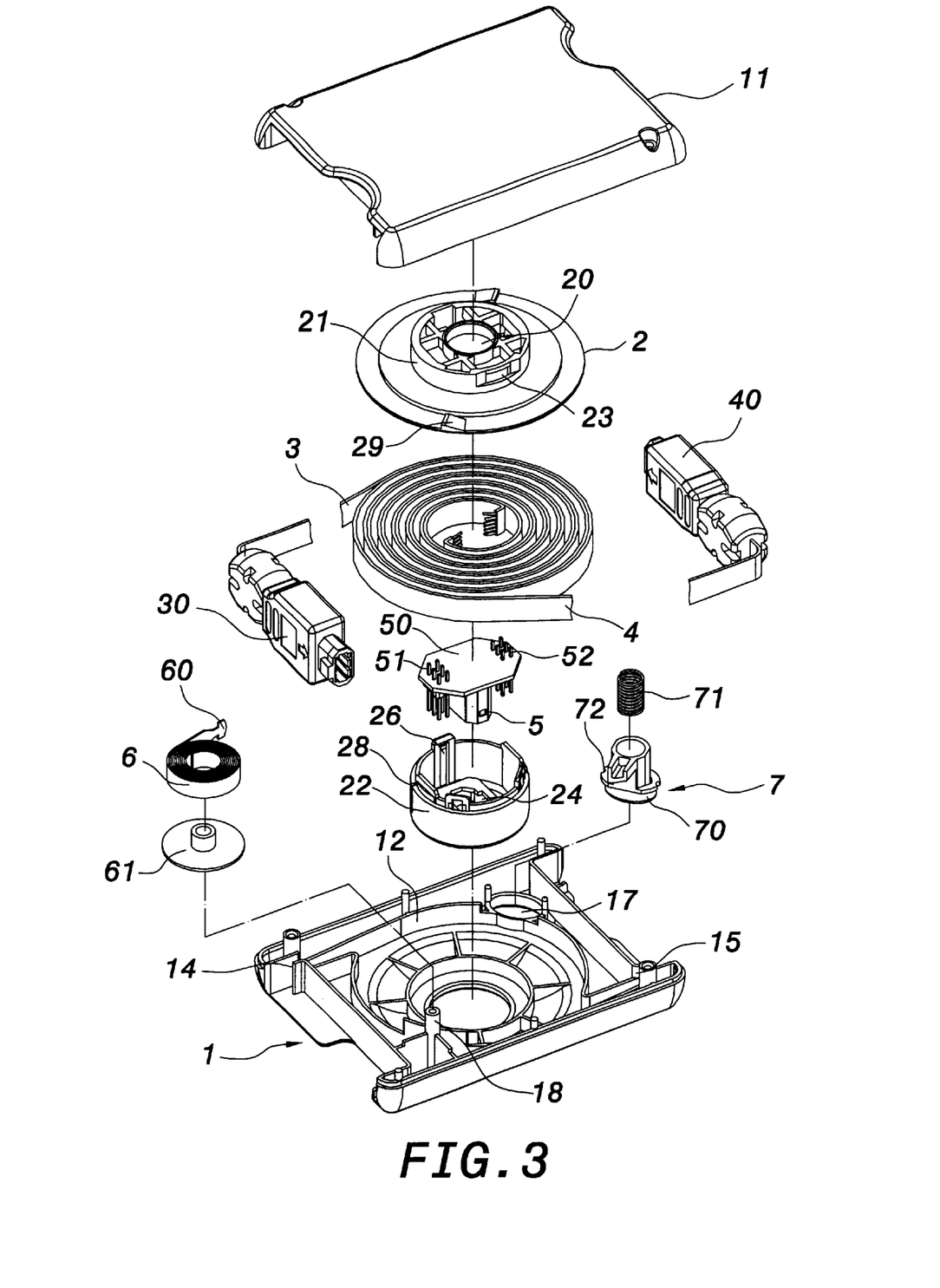
FIG. 3 is another exploded perspective view of the present invention from another view.
Figure 4:
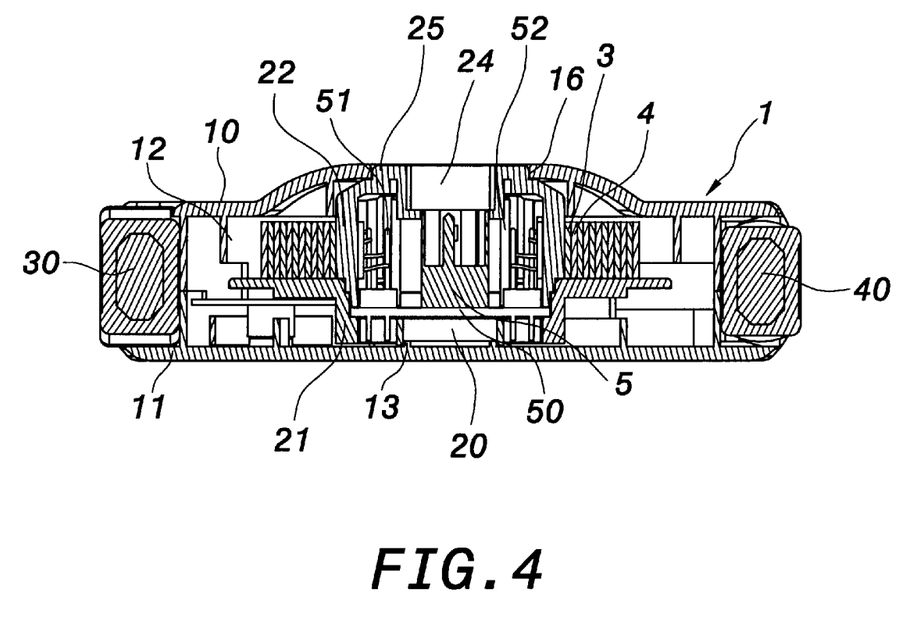
FIG. 4 is a cross sectional view of the present invention.

Therefore, under the ejection of the spring 71, the rotary disk 2 rotates clockwise as shown in FIG. 3. The buckling block 72 will buckle the stopper 29 of the rotary disk 2 for stopping the rotation of the rotary disk 2. When the first communication wire 3 and second communication wire 4 are pulled out to drive the rotary disk 2 to rotate as illustrated in FIG. 3. The stopper 29 will leave from the buckling block 72 smoothly by the tilt surface so that the rotary disk 2 rotates continuously, thus the first communication wire 3 and second communication wire 4 can be pulled out continuously. When a predetermined length is pulled out and then it is released so that the rotary disk 2 restores steadily by the uniform elastic force from the spiral spring 6, the stopper 29 of the rotary disk 2 will be buckled by the buckling block 72 so as to confine the rotation of the rotary disk 2. Therefore, the first communication wire 3 and second communication wire 4 can not be rewound. Therefore, parts of the first communication wire 3 and second communication wire 4 are retained out of the box. No trouble to the user is induced. However, the user only necessarily presses the key 70 so that the buckling block 72 leaves from the stopper 29. Then the rotary disk 2 may restore to rotate so as to rewind the first communication wire 3 and second communication wire 4 rapidly.

Figure 7:
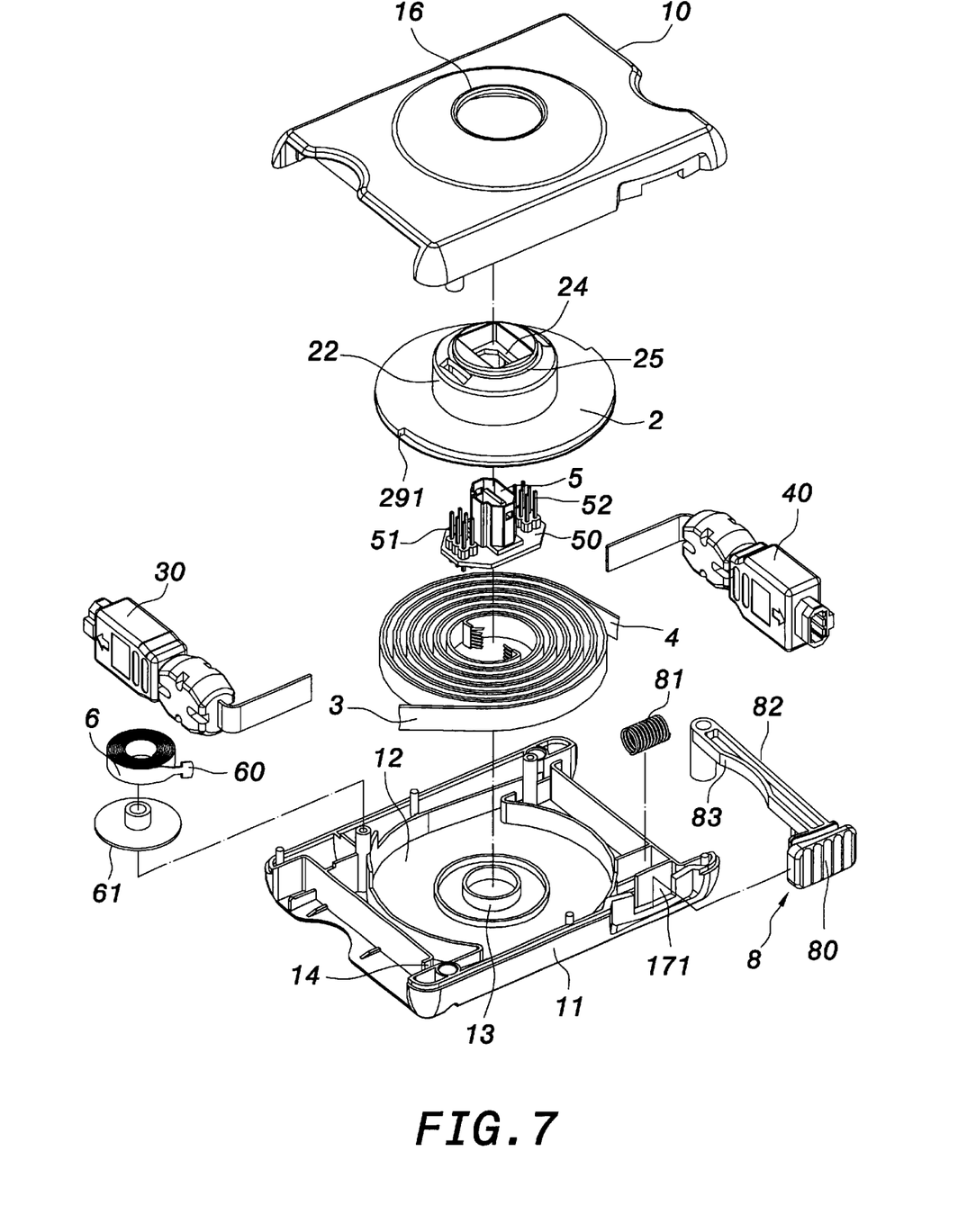
FIG. 7 is an exploded perspective view of another embodiment of the present invention.

With reference to FIGS. 7 and 8, to avoid that as the user draws the first communication wire 3 and second communication wire 4, the user is affected by the winding tension, a periphery of the rotary disk 2 is installed with a plurality of buckling grooves 291 with an unidirectionally buckling function. A control device 8 is installed adjacent to the rotary disk 2, which is formed by a key 80 and a spring 81. The key 80 is matched to the key hole 171. A lever 82 is connected to the inner side of the key 80. Another end of the lever 82 is pivotally installed to the housing 1. The spring 81 is installed between the lever 82 and the housing 1. The lever 82 is installed with a buckling block 83. The spring 81 may drive the lever 82 so that as the rotary disk 2 rotates, the buckling block 83 can buckle the buckling groove 291 so as to stop the rotary disk 2. The user only necessarily push the key 80 so that the buckling block 83 separates from the buckling groove 291. The rotary disk 2 may restores to rotate, thereby, winding the first communication wire 3 and second communication wire 4. The principle and operation are identical to the control device 7, and thus the details will not be further described.

Figure 5:
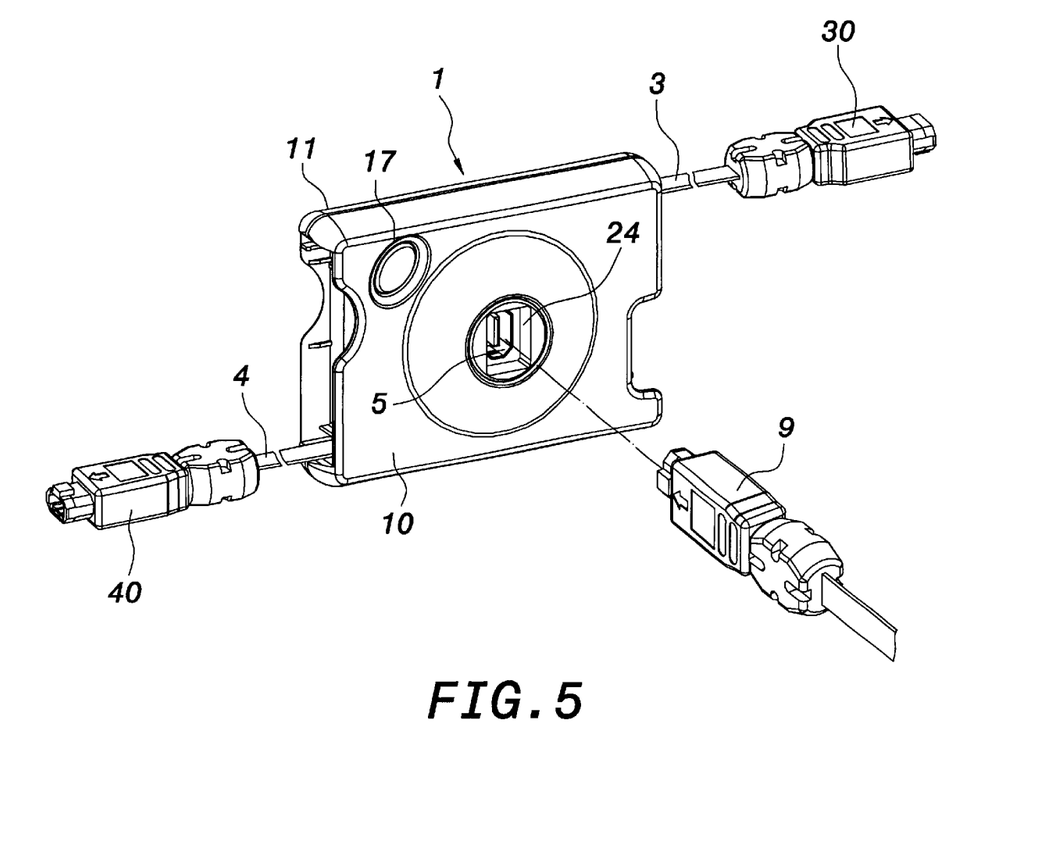
FIG. 5 is a schematic view showing the use of the present invention.
Figure 6:
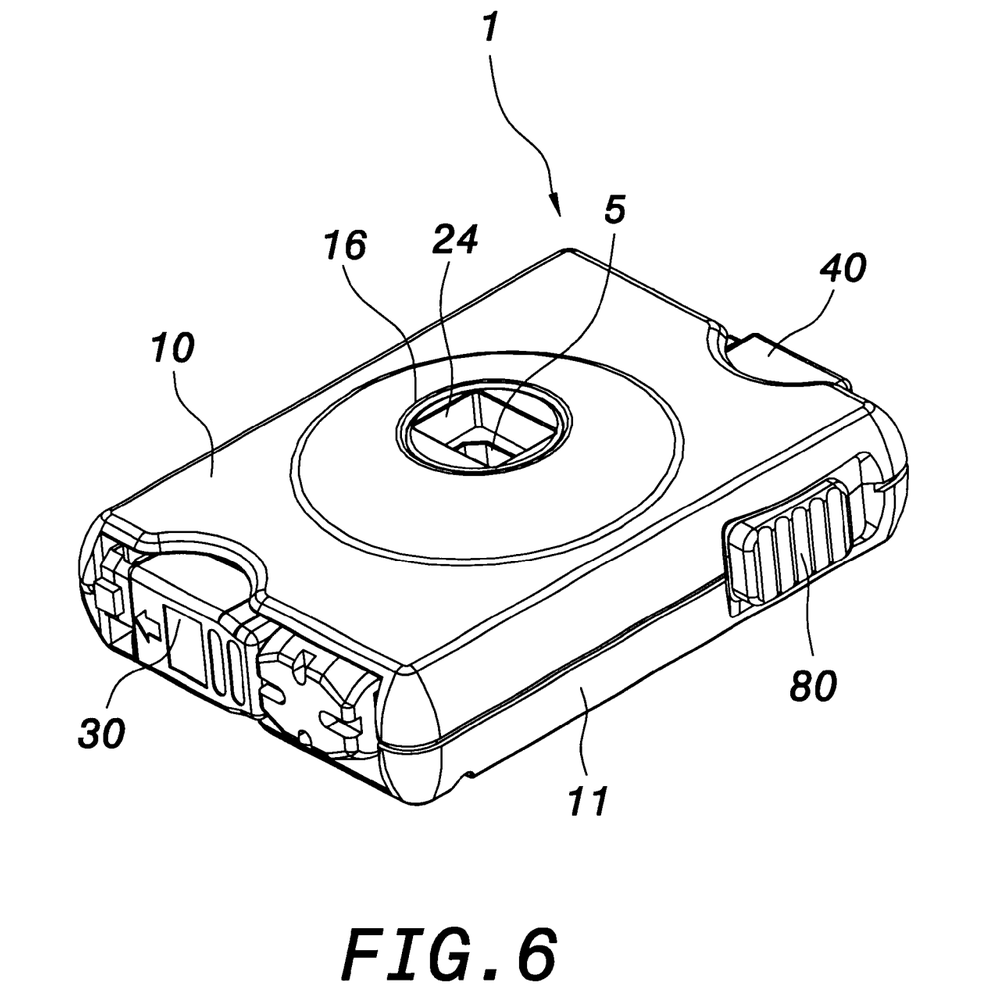
FIG. 6 is an assembled perspective view of another embodiment of the present invention.

Referring to FIG. 5, in the winding box of the present invention, other than the plugs 30 and 40 to be inserted between two communication devices, the first communication wire 3 and second communication wire 4 can be engaged with a plug 9 of a third communication device through an auxiliary receptacle 5 for achieving the object of connecting three communication devices. Therefore, the present invention has wide applications. As shown in the figures, if the present invention is used to a game machine, it can be used to connect three game machines of different users. Therefore, three peoples may joint a game at the same time.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A winding box with an auxiliary receptacle comprising:
a housing having a receiving groove therein, and the housing installed with a through hole;
a rotary disk pivotally installed to the receiving groove;
a spiral spring installed between the housing and the rotary disk;
two communication wires wound around the rotary disk; wherein outer wire ends of the two communication wires are capable of passing out of the housing; and
an auxiliary receptacle installed within the housing; the auxiliary receptacle being connected to inner wire ends of the two communication wires, and being positioned with respect to the through hole.

2. The winding box with an auxiliary receptacle as claimed in claim 1, wherein the receiving groove of the housing is installed with a pivotal shaft; the rotary disk has a pivotal hole so as to be engaged with the pivotal shaft, thus the rotary disk can rotates; one side of the rotary disk is installed with a first ring; the first ring is installed with a hook groove for being buckled by a hook end of the spiral spring, thereby, the spiral spring is installed between the housing and the rotary disk.

3. The winding box with an auxiliary receptacle as claimed in claim 1, wherein one side of the rotary disk is installed with a second ring, the second ring is assembled to one side of the rotary disk, the second ring is installed with an inserting hole; one lateral wall of the second ring have two wire grooves; the two communication wires are wound around the second ring; the inner wire ends of the two communication wires insert into the second ring from the wire grooves; the auxiliary receptacle is installed within the second ring, and the auxiliary receptacle are positioned with respect to the inserting hole and through hole.

4. The winding box with an auxiliary receptacle as claimed in claim 1, wherein outer wire ends of the two communication wires are connected to a first plug and a second plug.

5. The winding box with an auxiliary receptacle as claimed in claim 1, wherein the auxiliary receptacle is installed on a circuit board; the circuit board is installed with a plurality of first conductive terminals and a plurality of second conductive terminals; the first conductive terminals and second conductive terminals are electrically connected to the auxiliary receptacle; the first conductive terminals and second conductive terminals are connected to the inner wire ends of the two communication wires so that the auxiliary receptacle are connected to the inner wire ends of the two communication wires.

6. The winding box with an auxiliary receptacle as claimed in claim 1, wherein a control device is further installed, which is formed by a key and a spring; a plurality of stoppers with unidirectionally buckling effect are installed on the rotary disk; the key is fitted to one key hole in the housing; the spring is installed between the key and the housing; the key is installed with buckling block for buckling the stopper as the rotary disk rotates so as to stop the rotary disk.

7. The winding box with an auxiliary receptacle as claimed in claim 1, wherein a control device is further installed, which is formed by a key and a spring; a plurality of buckling grooves with unidirectionally buckling effect are installed on the rotary disk; the key is fitted to one key hole in the housing; the key is connected to a lever; another end of the level is pivotally installed with a housing; the spring is installed between the lever and the housing; the lever is installed with buckling blocks for buckling the stopper as the rotary disk rotates so as to stop the rotary disk.

* * * * *